April 15, 1947.  J. N. HELTZEL  2,419,022
SLAB CONNECTION
Filed Aug. 20, 1945  4 Sheets-Sheet 1

INVENTOR.
John N. Heltzel
Eugene E. Stevens
ATTORNEY.

April 15, 1947. J. N. HELTZEL 2,419,022
SLAB CONNECTION
Filed Aug. 20, 1945 4 Sheets-Sheet 2

INVENTOR.
John N. Heltzel
Eugene E. Stevens
ATTORNEY.

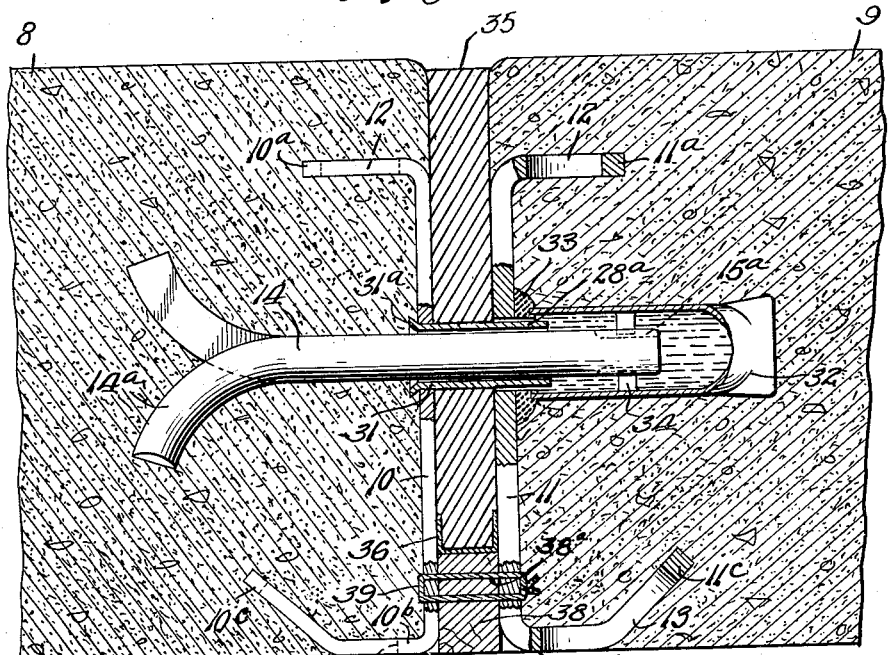

April 15, 1947.  J. N. HELTZEL  2,419,022
SLAB CONNECTION
Filed Aug. 20, 1945  4 Sheets-Sheet 4

Inventor
John N. Heltzel.
By Eugene E. Steven
Attorney

Patented Apr. 15, 1947

2,419,022

UNITED STATES PATENT OFFICE 2,419,022

SLAB CONNECTION

John N. Heltzel, Warren, Ohio

Application August 20, 1945, Serial No. 611,510

28 Claims. (Cl. 94—18)

My invention relates to improvements in dowel bars, and dowel bar incorporating structures, or the equivalent, for connecting adjacent concrete or other slabs, especially in airport, highway and other surfacing structures, although it is susceptible of other use.

It is a recognized fact, of course, that the dowel, or other connection, at the expansion and contraction joints between highway and airport slabs necessarily functions as the medium for the transfer of very heavy loads from one slab to another. Since the maintenance of a smooth unbroken transit surface is of paramount importance in such constructions, proper and efficient joint doweling poses one of the most difficult problems which the highway or airport construction engineer has to face. In point of fact it is not going too far to say that the serviceable life of the highly expensive present-day airport and high speed highway depends very largely upon the efficiency of the doweling of the expansion and contraction joints between slabs.

Although a slab-connecting dowel bar may be, say two feet long, it is only the one inch or so which spans the joint space that serves as the direct load transfer medium between slabs. Unfortunately, the exposed joint-spanning, load transferring portions of prior art dowels are prone to corrode, rust away, or otherwise so deteriorate as to become unserviceable in a comparatively short time. This corrosion, etc., results from moisture and/or acid action, etc., in spite of attempts at joint sealing and other remedial effort, and when it happens, the bars cease to function as load transfer means, and/or "freeze" in their bearings, if used, and impede slab contraction and expansion. Slab buckling or cracking with attendant uneven transit surface is the result.

Asphaltic and other joint sealing expedients do not prevent joint openings, especially in cold weather when the slabs contract. Therefore, surface water and acids have access to the joint spanning dowel bar portion. A surprising amount of acids of various kinds accumulate on highway surfaces, particularly in agricultural, industrial and mining districts.

Furthermore, the exposed, load transferring portion of the dowel bar is initially subject to attack, not only by rust but also by aciduous substances, such as lime or calcium in the concrete mix when the surface is laid; and by acid-contamination of the water used in mixing the concrete.

Thus, at the outset, rust and corrosion, with or without the ordinary slight friction between the joint spanning dowel and its bearing, usually tends to resist proper compensating movement of the dowel as the freshly poured slabs contract and move away from one another at the joint during their initial "setting" or drying out period. The result of so subjecting the dowels to tension is that their original anchorage in the slabs is disturbed or weakened. In other words, the concrete immediately surrounding the anchorage is so fractured or disturbed as to cause minute fissures to develop in the concrete.

Therefore, those versed in the art are agreed that great damage has been done to this most critical and important part of the slab before it has gone into service, and it follows that ultimately rust and/or corrosion will cause total "freezing" of the dowel in respect to its socket bearing with such attendant further loosening of the dowel anchorage as to destroy entirely the efficiency of the dowel installation as a load transfer element.

The invention therefore has for one of its primary objects, the provision of a dowel installation, the critical load transporting portion of which will be protected against deterioration by rust corrosion or otherwise whereby to maintain the load transferring efficiency of said dowel.

Another object of the invention is to incorporate in such installations, means which will cause the dowel bar and/or its socket and the carrier plates therefor, if used, to partake of the compensatory inward movement commensurate with slab shrinkage as evidenced at the joint between same, whereby to prevent "freezing" of the dowel in its socket and a weakening of slabs adjacent the joint therebetween as the result of relative movement of the aforementioned parts, especially dowel anchors, if used.

Tests have shown that the effect of load impact at and adjacent the joint face of the slab in which the dowel bar is anchored is only from one-fourth to one-half that at the similar area of the other slab. Thus, it follows that the shear plate or reinforcement at the joint face of the dowel anchoring slab need only be from one-fourth to one-half as heavy gauge as the companion member of the opposed slab which slidably receives the dowel bar.

Therefore, as intimated hereinabove, it is an object of the invention to effect economy of material by using shear plates of only such gauge as is necessary to meet load conditions. In airport and highway construction, this saving will be very great.

The invention also resides in certain novel features of construction, combination and arrangement of the various parts as will be understood and appreciated by those skilled in the art from a reading of the following detailed description, in connection with the accompanying drawings which illustrate several embodiments of my inventive concept.

It should be recognized, however, that the invention is susceptible of many other mechanical expressions within the spirit and scope of the subject matter claimed hereinafter.

In the drawings, wherein the same reference characters have been used to designate the same parts throughout the several views, Fig. 1 is a cross sectional view through a slab joint illustrating one form of my dowel installation;

Fig. 6 is a sectional view through a slab joint illustrating a further modified form of dowel joint installation, parts of same being broken away and shown in section and illustrating expandible spreading means for the shear plates at a different location from that illustrated in previous views;

Fig. 7 is a view similar to Fig. 6, but showing a further modification of the invention which incorporates means in association with shear plates or slab face reinforcements for preventing vertical splitting of the slabs in line with a dowel bar;

Figure 1:
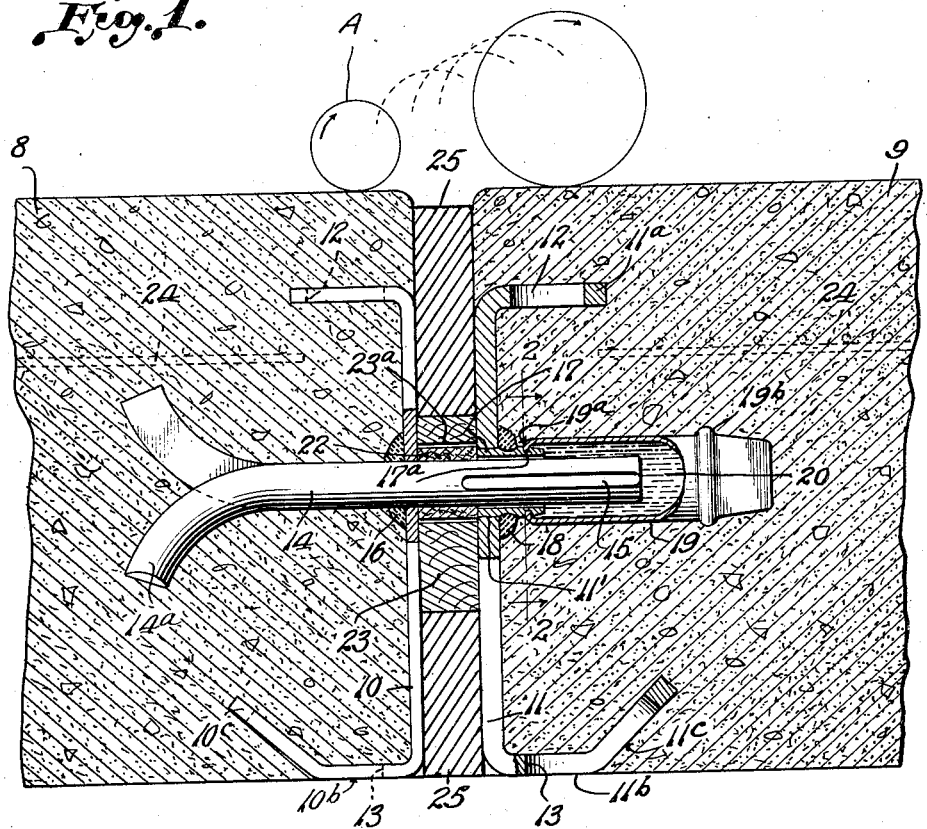
Figure 2:
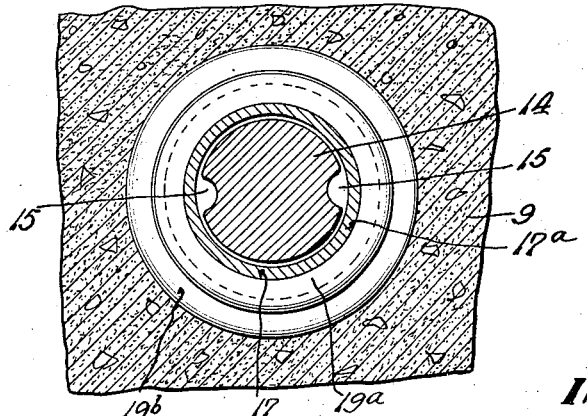
Fig. 2 is a cross sectional view taken on the line 2—2 of Fig. 1.

Referring to the drawings by reference characters, and turning first to the form of invention shown in Figs. 1 and 2, numerals 8 and 9 designate adjacent slabs of concrete roadway or airport, there being disposed between the slabs a joint space as usual, receiving a filler 25.

Embedded in the opposed faces of the slabs 8, 9 are shear plates 10, 11, respectively. The upper ends of said plates being turned inwardly as indicated at 10a, 11a, and provided with holes 12 for reception of cement to effect a better bonding of said shear plates in the slabs. The gauge of the shear plate 11 is greater than the gauge of shear plate 10, which latter has extended thereinto the end of the dowel bar 14 which provides the laterally extending anchors 14a. Experience has taught that a thinner gauge shear plate 10 may be used in the slab such as 8, in which the dowel 14 is anchored, than is required for the slab 9 in which the free end of the dowel 14 is slidably received. The reason for this is that the effect of load impact at and adjacent the joint face of the dowel anchoring slab 8 is only from about one-fourth to one-half as great as the load impact effect at the similar area of slab 9. This comparative load impact effect is illustrated diagrammatically by the truck wheel A (Fig. 1) moving in the direction of the arrow across the slab joint.

The free end of the dowel bar 14 is provided at opposite sides with lubricant grooves 15 extending from a point inwardly of the said dowel bar to a point in the joint space between slabs as shown in Fig. 1.

Dowel bar 14 is welded as at 16 to the shear plate 10, but it is to be understood that the weld can be eliminated if the dowel bar is forced into the opening of such shear plate under pressure.

Still referring to Fig. 1, the shear plate 11 is shown as having a transverse hole 11' receiving the outer end of a short corrosive resisting bearing sleeve 17 which is preferably made of bronze, brass or other suitable metal or non-corrosive material secured to the inner surface of the shear plate 11 as indicated at 18.

Figs. 1 and 2 also disclose the bearing sleeve 17 as having associated therewith a diametrically larger socket extension 19 providing the lubricant receiving chamber 20 which is also diametrically larger than said bearing sleeve 17. In the illustrated instance, attachment of the socket 19 to the bearing sleeve 17 is effected by means of a circumferential inturned lip 19a of said socket engaging in an annular groove 17a in the bearing sleeve, inwardly of the inner end thereof.

So that the socket 19 will itself have a bonding engagement with the body of slab 9, I provide such socket with an annular shoulder 19b inwardly of its inner end.

Fig. 1 illustrates the lubricant chamber 20 as containing a lubricant 21 which may be a mixture of graphite with oil or other ingredients. It will be appreciated that as the slabs 8 and 9 expand or contract, as the result of climatic change, the dowel bar 14 will work piston-fashion in the bearing 17 and communicating lubricant chamber 20. The result is that lubricant 21 from said chamber 20 will be carried into the joint space between the slabs by means of the side grooves 15 in the dowel bar. It should be noted in passing that the lubricant grooves 15 will preferably be located at the sides of said bar rather than at the top or bottom thereof, which portions, of course, constitute the load contacting or sustaining portions.

As a means for further protecting against rust or corrosion, the joint spanning portion of said dowel bar 14, I provide same with a grease saturated fabric washer which will preferably be of a compressible and expansible nature. It will be apparent that such washer 22 will absorb surplus grease or oil received from the lubricant grooves 15 of the bar and thus maintain a protective grease film upon the joint exposed bar portion.

As previously intimated, the hardening of the green concrete of the slabs 8 and 9 causes the same to shrink, thus bringing about a widening of the joint space spanned by the dowel bar 14. There is, therefore, a tendency for the anchor ends 14 of said bar to loosen in the slab 8; and this is especially true if the bar 14 should for some reason bind in the bar sleeve 17. Therefore, in order to effect compensating movement of the dowel bar 14 in an anchorward direction commensurate with the inward movement of the joint face of slab 8 due to shrinkage in drying, I provide between the shear plates 10, 11 an expansible wooden block 23. This block 23 will preferably be of a thickness equal to, or greater than, the thickness of the joint strip 25 between the slabs when the same are poured or laid. The block 23 will be of highly absorbent texture so as to expand progressively while absorbing moisture from the freshly laid concrete. In other words, the idea is for the block 23 to expand to substantially the same extent that the slabs 8 and 9 contract. Then, the dowel bar 14, being welded to shear plate 10, will not tend to move relatively of slab 8 during the drying process and the anchors 14 will not loosen in the slab. Nor will there be a tendency toward the production of fissures in the slab 8 during the drying operation, caused by resistance of the dowel bar to move out of the socket. Thus, the anchorages of the shear plates 10, 11, and likewise the dowel anchors 14a will be forced to remain in position during the shrinkage or contraction of said slab 8.

The expansible block 23 is preferably located between the slab faces pretty well toward the lower sub-grade so as to overcome any tendency of the upper portions of the slabs to approach one another and produce a buckle or ridges, usually termed "blow-ups," which result in disintegration of the traffic bearing surface.

By use of the joint construction described, I am able to use a much lighter gauge horizontally disposed slab-reinforcing mesh 24 than heretofore, and even, in some instances, dispense with it entirely without loss of efficiency. This saving alone is, in the aggregate, a very substantial one.

Fig. 1, as previously mentioned, shows the joint space between the slabs as provided with the usual filler strip 25. This may be of bituminous or asphalt material.

Figure 3:
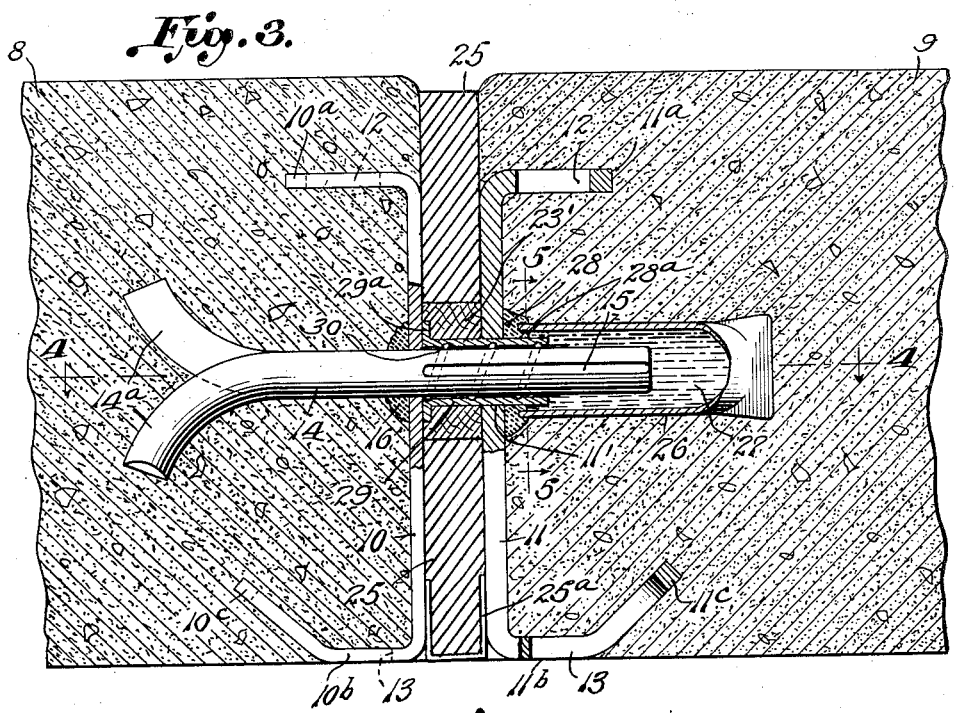
Fig. 3 is a view similar to Fig. 1, but illustrating a somewhat modified form of the invention.
Figure 4:
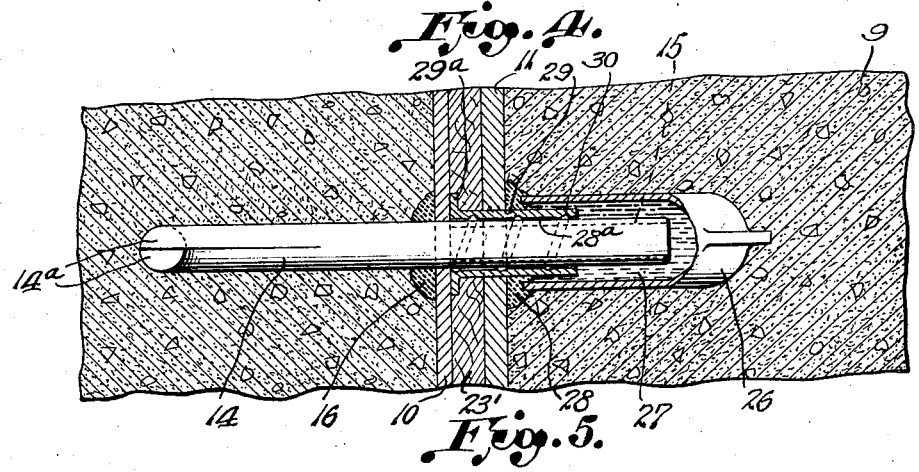
Fig. 4 is a longitudinal sectional view taken on the line 4—4 of Fig. 3.
Figure 5:
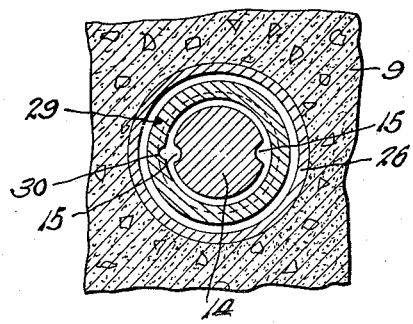
Fig. 5 is a cross sectional view taken on the line 5—5 of Fig. 3.

The form of invention illustrated in Figs. 3, 4 and 5 differs from the Figs. 1 and 2 disclosures in that the dowel bar 14 is not only slidable in a bearing sleeve 29, but said sleeve 29, instead of being fast in the hole 11 of the shear plate, or end reinforcement 11 of slab 9, is also slidable therein. Also, the lubricant socket 26 which provides the lubricant chamber 27 is welded as at 28 to shear plate 11, and the material of the weld is reamed out and smoothly finished to provide an added bearing 28a for the slidable sleeve 29, concentric with shear plate hole 11'.

The slidable bearing sleeve 29 has its inner end terminating in a lateral circumferential flange 29a which is received in the adjacent annular recess of the expansible wooden block 23' which is disposed about the sleeve 29.

In order to facilitate transmission of lubricant 27 from the socket chamber 26 to the bearing space between dowel bar 14 and its sleeve 29, the interior surface of the latter is provided with a special lubricant groove 30. Thus, inward movement of dowel bar 14 forces lubricant into the spiral groove 30 of the bearing sleeve by way of the side grooves 15 of the dowel bar.

The joint strip 25, as illustrated in Fig. 3, has its lower end seating in a metal channel 25a of U-shaped form, which supports and secures the bottom of the strip in alignment.

From the foregoing description, it will be apparent that the sleeve 29 projecting across the joint space will substantially protect the dowel bar 14 from moisture, acids, etc. Also, there is provided in effect a duplex slidable bearing by reason of the fact that both the sleeve 29 and the bar 14 are slidable relatively of the shear plate 11 of slab 9. In event the sleeve 29 should stick in its bearing 11', 28a the dowel rod 14 will still slide; and should the dowel bar 14 have too tight an initial fit in sleeve 29, the latter will slide, it being apparent that lubricant from the socket chamber 26 will have access to the sleeve bearing 11', 28a.

The dowel bar illustrated in Figs. 3–5 will preferably be of cold rolled steel having a finished surface, at least on the free or sliding end.

Fig. 4 illustrates the slabs 8 and 9 as being in an expanded condition, as from heat action. Here the wooden block 23', having dried out, is in effect compressed. On the other hand, Fig. 3 depicts the slabs as contracted, leaving a relatively wide joint therebetween and the block 23' as expanded. Of course, expansion of the block 23' maintains the flanged end 29a of sleeve 29 against the adjacent face of the dowel bar carrying shear plate 10.

The wooden or other moisture expanding block 23' of Figs. 3 and 4, is disposed in what might be termed "neutral" position about the dowel bar 14, midway the depth of the slabs. Therefore, no eccentric force is applied to the abutting slab surfaces as in the Fig. 1 illustration, and the block 23' functions to urge the dowel bar 14 in its sleeve 29 to move in their bearings.

Turning now to the modification of the invention shown in Fig. 6, the shear plates 10 and 11 which are incorporated in the slabs 8, 9, respectively, are the same as the correspondingly numbered shear plates disclosed in previously described modifications. The same applies to the dowel bar 14 which has the split laterally turned anchor portions 14a. However, the oil grooves of previous figures are dispensed with and comparatively short top and bottom grooves 15a are provided. These grooves 15a receive fingers 34 extending inwardly from an oil socket 32 so as to support and align the dowel bar 14 and prevent rotation of the dowel 14, especially when the slabs are being poured. Such rotative action at this time would tend to result in the anchors 14a being loose in the concrete of slab 8 rather than solidly embedded therein.

Here, the dowel bar 14 extends through a sleeve 31 which is arranged differently than the sleeve 29 of Fig. 3, in that its exteriorly beveled flange 31a is extended through the opening of the shear plate 10. Thus, the sleeve 31 serves to keep foreign matter such as acids, etc., from the joint spanning portion of the dowel bar 14. It will be understood that sleeve 31 is made fast to shear plate 10 in any preferred manner. As illustrated, said sleeve is forced into the shear plate opening under pressure but of course, it may be welded or otherwise secured. The respective bases and outer upwardly angled ends 10c, 11c thereof of shear plates 10, 11 may have openings 13 to effect a better bond in the body of the associated slab.

The dowel bar 14, as disclosed in Fig. 6 may have a tight fit in the sleeve 31 so as to be fast therewith and in such event, the dowel bar 14 may be of hot rolled material and left in an unfinished state. Thus, when the slabs 9 and 10 expand or contract, the compensating movement will be taken care of by the sleeve 31 rather than by the dowel, per se. The welding or brazing material 33 which, in Fig. 6 illustration secures the oil socket 32 to the shear plate 11, may be reamed out in alignment with the hole of shear plate 11 so as to provide a bearing 28a for the inserted portion of the bearing sleeve 31. As illustrated, oil from the socket 32 will have access to the aforementioned bearing 28a provided by the welding or brazing material 28.

The usual filler or expansion joint strip 35 which is disposed between the slabs 8 and 9, is fore-shortened as illustrated in Fig. 6, and has its lower edge received in a metal aligning channel 36. This channel 36 may be nailed as at 37 to the top of an expansible wooden bar 38 which, of course, functions somewhat as the expandible blocks 23 of Fig. 1, and 23' of Figs. 3–5. Also, the shear plates 10, 11 of Fig. 6 may be temporarily secured to said expansible wooden bar 38 so that the latter may function to initially secure and space the bottom portions of the shear plates 10, 11 before and while the slabs are being poured.

Of course, the connection of the shear plates 10, 11 to the wooden bar 38 must be strictly temporary because otherwise the shear plates 10, 11 would be separated from the slabs during the shrinking or drying out period, during which time no structural strength would be present in the plastic mass. One way of affecting said temporary connection is by the use of a preferably cotton or other fabric cord 39 which is passed through holes 38a in the wooden bar 38 and tied about the shear plates 10, 11. This cord will be impregnated with an assiduous powder or suitable chemical so that it will be burned or otherwise disintegrated by contact with moisture in the wet concrete before the slabs begin to shrink. By disposing the expansible wooden bar 38 on or adjacent the sub-grade, the tendency of the slabs 8, 9 to curl is greatly diminished.

Still another modification of the invention is disclosed in Fig. 7, wherein the usual slabs 8 and 9 are illustrated fragmentarily and the associated shear plates 10' and 11' correspond to the previously mentioned shear plates except as hereinafter noted. Fig. 7 shows each of the shear plates 10', 11', as having a medially struck recess portion 42 adjacent the openings therethrough; and their rearwardly extending upper arms 10a, 11a, have welded to their outer ends as at 45a the auxiliary anchoring bars 45 whose terminals are bent laterally and upwardly as indicated at 45b. The function of these auxiliary anchoring bars 45 is to prevent cracking of the slabs at the line of the dowel bar 40 which extends through the shear plates 10', 11'.

The instant embodiment of the invention differs from those previously described in that neither end of the dowel bar 40 is anchored, there being bearings 41 secured in the holes of the respective shear plates 10', 11'' through which said dowel bar extends into the oil chambers 44 of the lubricant sockets 43. The dowel bar bearings 41 are cylindrical adjacent their outer end and from that point they taper in frustro-conical fashion as indicated at 41a to the disc-like base portion 41b which is received in the proximate recess 42 at the inner surface of the associated shear plate.

The usual expansion joint strip 25 is illustrated between the abutting faces of the slabs 8, 9 and disposed in an opening in said joint strip about the dowel bar 40 are two expansible wooden block members 46 having interposed between them a block 47 composed of fibrous or other material which has much greater absorbing qualities than the wooden blocks 46 and thus tends to expand much more and also much sooner than is the case with the wooden blocks 46. The material of which the block 47 is made may be a variety of plastic or may be some special wood or material having an extraordinarily high moisture absorbing and expanding characteristic which will be a conductor and distributor of moisture to the inside surface of the wood blocks or other expandable material 46 to increase and hasten expansion of same.

In reference to the assembly of the bearings 41 in the holes of the shear plates 10'', 11'', it should be mentioned that said holes are initially diametrically larger than the cylindrical outer ends of the bearings 41. After the bearings 41 have been inserted as shown, the stock of the shear plates 10, 11 is forced by pressure into contact with the tapered portion 41a of said bearings as illustrated in Fig. 7, producing circular recesses or indentations 42. Thus, said tapered bearing portions 41a will prevent inward movement of the bearings 41 while the bearing flanges 41b will, of course, prevent outward movement of said bearings 41. The tapered portions 41a of said bearings have a further function in that they serve to receive and retain the open ends 43a of the oil sockets 43, which ends are constricted upon said tapered bearing portions 41a, as illustrated.

The circular recesses or indentations 42 about bearing portions 41a serve to reinforce the shear plates, thereby permitting lighter gauge material to be used.

Dowel bars 14 of Figs. 1–6, inclusive, and the dowel bar 40 of Fig. 7 may, of course, be made of non-corrosive metal such as stainless steel, Monel metal, nickel clad steel, steel containing a copper content or having a copper coating; and, of course, the same applies to the bearing sleeves which receive the dowel bars, and to the lubricant receiving sockets. The shear plates may be rust-proofed by galvanizing or may be otherwise coated with a rust-resisting surface application. However, it will be apparent that the employment of my invention for protecting the critical joint spanning portion of the dowel bars enables me to avoid use of such expensive metal for these items. There is advantage, of course, in forming the dowel bar protecting sleeves 29, 31, of Figs. 3 and 6, respectively, of non-corrosive metal and the same applies to the bearing sleeve 17 of Fig. 1, and the bearing sleeves 41 of Fig. 7.

Figure 8:
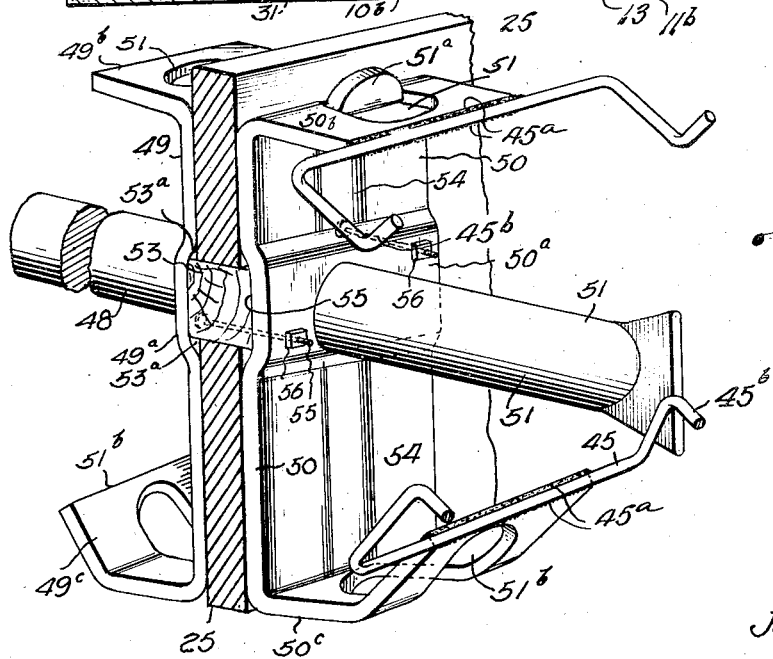
Fig. 8 is a perspective view of the form of invention shown in Fig. 7.

Referring to the form of invention shown in Fig. 8, same is similar to that disclosed in Fig. 7, in that the rearwardly extended top and bottom anchoring portions 49b, 49c and 50b, 50c of the respective shear plates 49, 50 have welded thereto as at 45a, the auxiliary anchoring bars 45 having the laterally bent terminals 45b. The upper rearwardly anchoring portions of the shear plates have the concrete receiving or bonding holes 51, while the lower anchoring portions have holes 51b for the same purpose.

It is to be noted that the stock of the upper anchoring flanges or portions 49b, 50b, which is left when holes 51 are cut, is bent upwardly to provide the joint strip engaging tongues 51a, which extend above the plane of the portions 50b, 49b.

The dowel bar 48 which may be carried by one of the slabs as in Fig. 1, or which may work in a lubricant receiving socket at both ends is, in the first instance, welded or otherwise frictionally secured to the shear plate 49 at the site of the inward transversely stamped or otherwise formed bulge 49a which extends entirely across the plate.

The other end of the dowel bar 48 is received in a lubricant containing socket or bearing 51 which may be frictioned or welded in a hole in the transversely bulged portion 50a of the shear plate 50. The bulge portion 50a is similar to the bulge portion 49a and each provides at its inner surface a transverse recess 53 which added to the normal joint space between the shear plates 49, 50 leaves a recess of very substantial size for the reception of an expansible wooden or other block 52 of much greater thickness than could otherwise be used.

The joint strip 25, of course, has an opening for the reception of the block or blocks 52 and the dowel bar 48, of course, extends through the block 52 or between the inner ends of adjacent blocks 52.

In order to further reinforce the shear plates 49, 50, I provide the vertical intermediately located bulges 54 extending inwardly from the top and bottom flanges to the transverse bulges 49a (or 50a) as the case may be. Use of the vertical bulges or ribs 54 is quite advisable to counteract any tendency that the transverse bulge 49a, 50a may have to weaken the shear plates.

Fig. 8 also shows that at the top and bottom of the wooden block 52, adjacent each side, the inward angle of the adjacent shear plate bulge leaves a triangular space 53a running the full width of the shear plates. These spaces 53a receive the soft cement or other block material when the slab is poured and/or during the expansion of the slab. This will compress the wooden or other expansible blocks 52 and will thereby relieve excessive resistance to the expansion of the slab sections.

There is great advantage when using a thicker expansible block 52 than is shown in the other herein disclosed forms of the invention, because obviously the thicker the moisture expanded block 52 is, the greater will be the amount of expansion thereof to urge contraction of the cement slabs and force the dowels and shear plate anchorages into position. Also, a substantial thicker block 52 will more readily diminish in thickness during the expansion of the slabs and will tend to crush more easily than a comparatively thin block.

Fig. 8 also illustrates an alternative to the use of the cord 39, of Fig. 6, for temporarily securing the shear plates to a moisture expandible block or bar. Here, I may avail myself of one or more very light bolts 55 having nuts 56 for temporarily securing the shear plates 49, 50 against the wooden bar 52 while the slabs are being poured. The bolts are, of course, passed through aligned holes in the shear plates 49, 50 and wooden bar 52.

The bolts 55 will be probably about ⅛" in diameter or may be larger and suitably weakened. When the nuts 56 are tightened up, the shear plates 49, 50 will lie tightly contiguous against the opposite faces of the wooden bar 52. The bolts 55 and their nuts 56 being then subjected to just about all the load they will sustain. Thus, when the wooden bar 52 expands under the action of moisture, the bolts 55 will break. Of course, when this happens, their function of maintaining the parts 49, 50, 52 in proper aligned assembly will have been performed.

Figure 9:
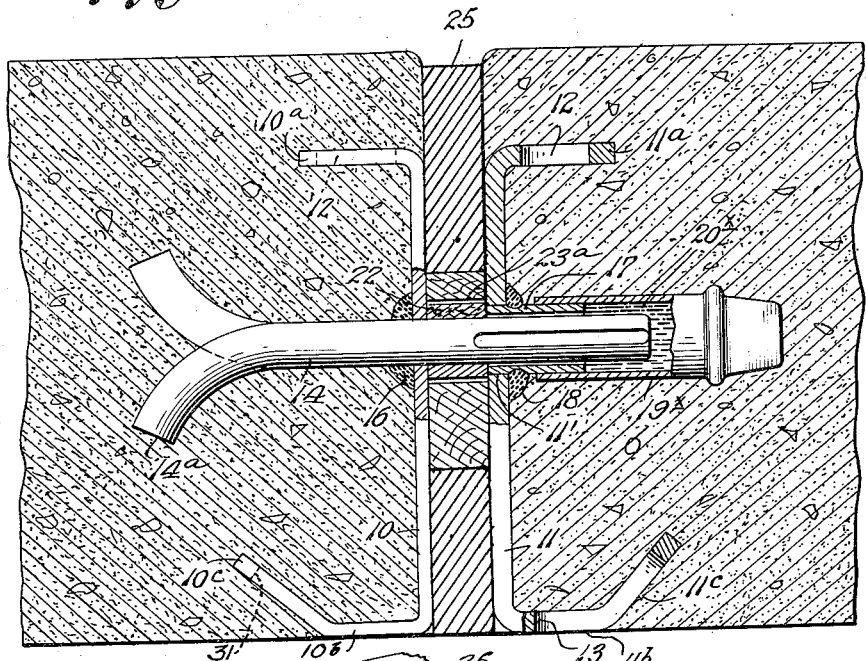
Fig. 9 is a cross sectional view of a further modified form of the invention differing from that of Fig. 1 only in the bearing and lubricant socket securing means.

Fig. 9 shows a form of the invention in all respects similar to that of Figs. 1 and 2 except that the lubricant socket 19x, which provides the lubricant chamber 20x, lacks the inturned flange or lip 19a which engages the bearing groove 17a. In Fig. 9 the socket 19x may be of metal or plastic and its open inner end is simply telescoped onto the inner end of bearing sleeve 17 and held in place by tight friction fit.

It will be appreciated that when the lubricant socket 19x is frictioned onto the bearing sleeve 17, it may be made of lighter gauge material than would be required if welding were resorted to.

I may also form the bearing sleeves of suitable plastic. For instance, impregnated fabric or pressed graphite may be used. Use of fabric bearings may serve to cushion the dowels and reduce the impact caused by traffic rolling over the joint. The lubricant chamber providing socket 19 of Fig. 1 may be telescoped, under pressure, onto the adjacent end of the bearing 17 instead of being sprung into the socket groove 17a. The lubricant chamber providing sockets illustrated may, of course, be made of material other than metal.

The expansible wooden bar 38 of Fig. 6 may, and preferably does, extend the full length of adjacent slabs.

From the foregoing description, taken in connection with the accompanying drawings, it will be apparent that I have provided simple and effective means for achieving the stated objects of the invention, and particularly for protecting the joint spanning portion of the dowel bars, in addition to preventing weakening of the slabs while maintaining a level transit surface.

Having thus described my invention, what I claim is:

1. A load transfer connection for expansible and contractable concrete slabs or the like comprising opposed slab face reinforcement members, anchor means carried by said reinforcement members and embedded in the associated slab, a dowel bar spanning the space between opposed slabs and supported by said reinforcement members, said dowel bar being slidable in at least one of said reinforcement members, and an absorbent moisture induced expansible member between said slabs at the site of said reinforcement members.

2. The combination set forth in claim 1, and said absorbent moisture induced expansible member disposed closer to the bottom of adjacent slabs than to the top thereof.

3. The combination set forth in claim 1, and said absorbent moisture induced expansible member comprising separate contiguous plies and the intermediate ply being more absorbent than adjacent plies and expanding quicker than the latter.

4. The combination set forth in claim 1, and said absorbent moisture-induced expansible member comprising a bar disposed adjacent the bottom of adjacent slabs, a filler strip in the space between the slabs and secured to said bar, and means temporarily securing said slab face reinforcement members to said bar whereby to hold same and said filler strip in position during the pouring of concrete for production of said slabs.

5. The combination set forth in claim 1, and said anchor means for said slab face reinforcement members, comprising at least one dowel-bar receiving lubricant containing socket fast to one slab-reinforcement member.

6. The combination set forth in claim 1, and said dowel bar being fast to one slab face reinforcement member and having anchors embedded in the associated slab, and a dowel bar-receiving lubricant containing socket fast to the other slab reinforcement and extending into the associated slab to constitute at least a part of the anchor means therefor.

7. The combination set forth in claim 1, and said anchor means for said slab face reinforcement members, comprising at least one dowel-bar receiving lubricant containing socket fast to one slab-reinforcement member, said dowel bar having at least one lineally extending lubricant receiving groove communicating from said socket to the space between said slab face reinforcing members, and said absorbent moisture-induced expansible member surrounding the joint spanning portion of said dowel bar.

8. The combination set forth in claim 1, and said anchor means for said slab face reinforcement members, comprising at least one dowel-bar receiving lubricant containing socket fast to one slab-reinforcement member, said dowel bar having at least one lineally extending lubricant receiving groove communicating from said socket to the space between said slab face reinforcing members, said absorbent moisture-induced expansible member surrounding the joint spanning portion of said dowel bar, and a fibrous-like lubricant collecting packing interposed between the dowel bar and said expansible member.

9. The combination set forth in claim 1, and said anchor means for said slab face reinforcement members, comprising at least one dowel-bar receiving lubricant containing socket fast to one slab-reinforcement member, said dowel bar having at least one lineally extending lubricant receiving groove communicating from said socket to the space between said slab face reinforcing members, said absorbent moisture-induced expansible member surrounding the joint spanning portion of said dowel bar, and a protective wear resisting sleeve on the joint spanning portion of said dowel bar between same and said expansible member, one end of said sleeve extending through the socket-carrying slab face reinforcement member, and a flange at the other end of said sleeve interposed between the expansible member and the other slab face reinforcement member.

10. A load transfer connection for expansible and contractable concrete slabs or the like comprising opposed slab face reinforcement members, a joint space spanning dowel bar extending through both of said reinforcement members, and sustained thereby, slab-embedded anchor means adjacent one end of said dowel bar, a bearing provided by the opposed slab face reinforcement member and slidably receiving the other end of said dowel bar, a protective sleeve surrounding at least the joint space spanning portion of said dowel bar, said sleeve being rigid and of heavy wear resisting material, one end of said sleeve extending into said bearing and slidable therein.

11. A load transfer connection for expansible and contractable concrete slabs or the like comprising opposed slab face reinforcement members, a joint space spanning dowel bar extending through and sustained by both of said reinforcement members and slidable in at least one of same, a dowel bar-receiving bearing carried by the reinforcement member through which said bar slides, and a dowel bar receiving lubricant containing socket carried by said bearing.

12. The combination set forth in claim 11, and said dowel bar having a lineal lubricant receiving groove extending from said socket to its joint spanning portion.

13. The combination set forth in claim 11, a protective wear resisting sleeve loose on the joint spanning portion of said dowel bar and working in said bearing, means tending to maintain said sleeve in joint spanning position, and a spiral lubricant receiving groove in said sleeve and receiving lubricant from said socket.

14. In a load transfer connection for concrete slabs or the like comprising an anchor-incorporating joint space spanning dowel bar fixed in one slab and slidable in the other; the combination of an absorbent moisture-induced expansion element interposed between said slabs, and dowel carried expansion element engaged means at the face of the slab in which the dowel is anchored and whereby to prevent loosening of the dowel anchor in its slab as the latter dries and contracts.

15. A load transfer connection for concrete slabs or the like comprising a joint space spanning slab-carried dowel bar slidable in at least one slab, and a rigid wear and stress resisting protective sleeve on the joint spanning portion of said bar, one of said slabs having a bearing recess adapted to receive said sleeve.

16. A load transfer connection for concrete slabs or the like comprising a joint space spanning slab-carried dowel bar slidable in at least one slab, a rigid protective sleeve on the joint spanning portion of said bar, and lubricant supply means for said bar and sleeve carried by the slab in which the bar slides, one of said bar and sleeve having lubricant conducting means communicating with the lubricant supply means.

17. A load transfer connection for concrete slabs or the like comprising a joint space-spanning slab-carried dowel bar slidable in at least one slab, a reinforcement in the face of the slab in which said dowel bar slides, a bearing for said dowel bar carried by one of said slabs and supported by said reinforcement, a lubricant socket carried by said slab face reinforcement and providing a lubricant chamber diametrically larger than said dowel bar, and inwardly projecting sustaining lugs carried by said lubricant chamber and engaging said dowel bar.

18. The method of producing concrete slab-incorporating structures such as roads having relatively movable inter-fitting dowel and sockets anchored in opposing slabs inwardly of the expansion joints therebetween, which method comprises rigidly securing a dowel to one slab face reinforcement member and a dowel protecting socket to another slab face reinforcement member, interfitting the dowel and socket and setting said members up in spaced joint space defining opposition to one another, disposing a moisture induced expansible medium in the joint space between said opposed slab face reinforcement members, and then permitting the slabs to dry, whereby the moisture induced expansible medium will expand against the slab face reinforcement members to force them and their anchors inwardly as the slab shrinks so that the dowel and socket anchors will not be loosened in the slabs or produce fissures in the event that the dowel sticks in its socket.

19. A load transference element between the end faces of concrete slabs, said element secured in bearing members anchored in the slabs, temporarly securing means to prevent separation of said bearing members during the pouring of the concrete about the members, said securing means being capable of absorbing moisture from the freshly mixed concrete whereby the aciduous condition of the moisture from the freshly laid concrete will co-act with an acid contained in said securing means whereby said securing means will deteriorate progressively with the hardening and contraction of the concrete slabs—permitting the slabs to move apart without resistance due to substantially complete disintegration of said securing means.

20. A load transfer element to transfer loads from one section across a space to another section, comprising bearing members anchored in the faces of the sections, a rigid stress and wear sustaining tubular member seated in each of said bearings and spanning the space, said tubular member being slidable in at least one of said bearings, a dowel bar within the tubular member, said bar to project for a substantial distance into each of said sections to absorb and transfer loads from one section to the other through said tubular member, said instrumentalities being so arranged to permit the sections to move apart or together in response to contraction and expansion of the sections.

21. A load-transferring slab connection for roadways and the like comprising in combination, reinforcing means embedded in each of opposed slab faces and having a rearwardly extending anchoring flange, a load-sustaining dowel bar extending through said reinforcing means and slidable in at least one of same, and an auxiliary anchoring means carried by said flange disposed transversely of and spaced from said dowel bar whereby to resist splitting of the slab in line with said bar, said auxiliary anchoring means terminating in rearwardly bent extensions disposed laterally of each side of said anchoring flange.

22. In a load-transferring slab connection, a slab face reinforcing plate having an apertured indentation providing a slab body engaging boss and a front recess, a dowel bar, a bearing slidably receiving said dowel bar and carried in said boss aperture, said bearing having an inner flange seated in said recess, the said bearing having its body tapering outwardly from said flange, and a lubricant socket having its inner end compressed about the tapered portion of said bearing adjacent the rear surface of said boss.

23. In a load transferring connection for road slabs or the like including opposed slab face reinforcing members, an intervening spacer member between said reinforcing members, said spacer member adapted to swell under action of moisture whereby to spread the reinforcing members apart, and frangible means for retaining the parts in assembled relationship during the pouring of slabs.

24. The combination set forth in claim 23, and said frangible means comprising light bolts having nuts thereon, said bolts being passed through the reinforcing members and intervening spacing member and the nuts drawn up to load the bolts to substantial capacity before the concrete for the slabs is poured.

25. A load transfer connection for expansible and contractable concrete slabs or the like comprising opposed slab face reinforcement members, a joint space spanning dowel bar extending through both of said reinforcement members, and sustained thereby, slab-embedded anchor means adjacent one end of said dowel bar, a bearing provided by the opposed slab face reinforcement member and slidably receiving the other end of said dowel bar, a protective sleeve of wear resisting material surrounding the joint space spanning portion of said dowel bar and loose thereon, one end of said sleeve working in said bearing, and means of acting upon said sleeve to tend to maintain the opposite end thereof in contact with the adjacent slab face reinforcing member.

26. A load transfer connection for expansible and contractable concrete slabs or the like comprising opposed slab face reinforcement members, a joint space spanning dowel bar extending through both of said reinforcement members, and sustained thereby, slab-embedded anchor means adjacent one end of said dowel bar, a bearing provided by the opposed slab face reinforcement member and slidably receiving the other end of said dowel bar, a protective sleeve surrounding at least the joint space spanning portion of said dowel bar, said sleeve having one end fast to the face reinforcement member of the slab in which the dowel bar is anchored, and the other end of said sleeve slidable in the bearing of the other reinforcement member.

27. A load transfer connection for expansible and contractable concrete slabs or the like comprising opposed slab face reinforcement members, a joint space spanning dowel bar extending through both of said reinforcement members, and sustained thereby, slab-embedded anchor means adjacent one end of said dowel bar, a bearing provided by the opposed slab face reinforcement member and slidably receiving the other end of said dowel bar, a protective sleeve surrounding at least the joint space spanning portion of said dowel bar, said sleeve being of rigid stress withstanding material, one end of the sleeve being slidable in the reinforcement member bearing and fast on said dowel bar and the other end of the sleeve being adapted to abut the adjacent slab face reinforcement member.

28. A load transfer connection for concrete slabs or the like comprising a joint space-spanning slab-carried dowel bar slidable in at least one slab, a reinforcement in the face of the slab in which said dowel bar slides, a bearing for said dowel bar carried by one of said slabs and supported by said reinforcement, a lubricant socket carried by said slab face reinforcement and providing a lubricant chamber diametrically larger than said dowel bar, and an inwardly projecting lug carried by said lubricant chamber, said dowel having a lineal groove in which said lug engages whereby to prevent rotation of the dowel bar especially when the concrete of the slabs is being poured.

JOHN N. HELTZEL.

REFERENCES CITED

The following references are of record in the file of this patent:

UNITED STATES PATENTS

| Number | Name | Date |
| --- | --- | --- |
| 2,042,524 | Hall | June 2, 1936 |